Figure 1:
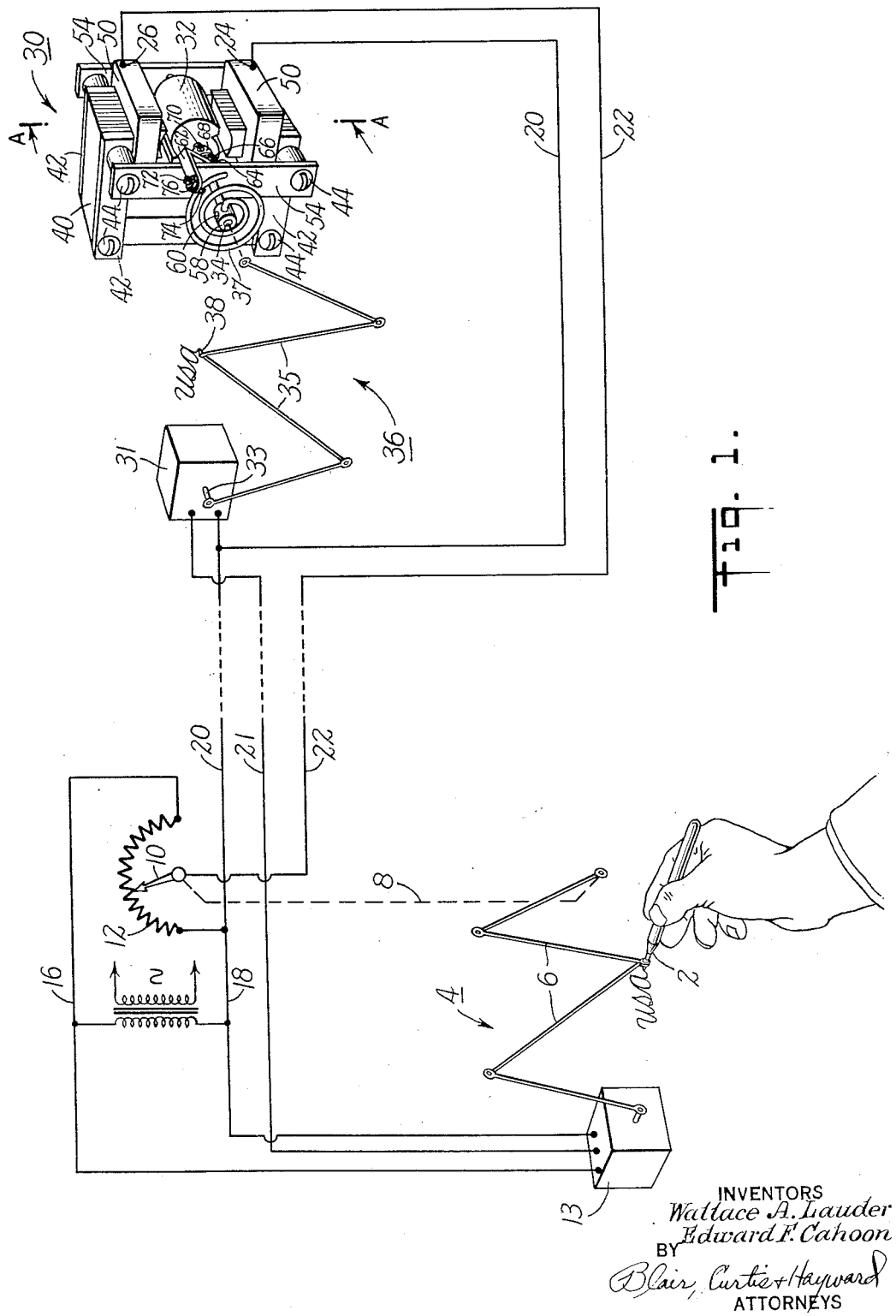

June 8, 1948.  W. A. LAUDER ET AL  2,442,853
MAGNETIC ROTATOR FOR TELESCRIBERS
Filed July 27, 1944  2 Sheets-Sheet 2

INVENTORS
Wallace A. Lauder
Edward F. Cahoon
BY
Blair, Curtis + Hayward
ATTORNEYS Patented June 8, 1948

2,442,853

UNITED STATES PATENT OFFICE 2,442,853

MAGNETIC ROTATOR FOR TELESCRIBERS

Wallace A. Lauder and Edward F. Cahoon, New City, N. Y., assignors to Telautograph Corporation, New York, N. Y., a corporation of Virginia Application July 27, 1944, Serial No. 546,892

6 Claims. (Cl. 172—120)

1

This invention relates to a device for translating a variable A. C. potential into a proportionate mechanical torque, and more particularly, to an A. C. reluctance rotator or motor element for accurately and linearly translating a variable A. C. potential into a high torque mechanical motion without the aid of complicated follow-up mechanisms dependent upon local sources of power to produce a high torque response.

This application is a continuation-in-part of our copending application, Serial No. 405,226, dated August 2, 1941, issued as U. S. Patent No. 2,355,087 on August 8, 1944, in which one useful application of the present invention is described.

In indicating, recording, telemetering, telescribing, control, and other similar apparatus, it is frequently necessary to transmit instantaneously the value of some condition being measured or adjusted. The most common and usually the most convenient method for doing this is to translate the value of the condition into an electric potential varying in accordance with the variations in the value of the condition and to transmit this potential through some available transmission medium as by radio, telephone, or electric power lines to some distant point where the electrical potential is transformed into a visible mechanical motion. While it is usually quite easy to translate a mechanical motion into an electrical value as by means of a potentiometer, variable inductor, or variable condenser, it is usually difficult to retransform such an electrical value into a mechanical motion corresponding exactly to the original condition. This is true especially when such mechanical motion must accurately and instantaneously represent the value of the condition being measured and must exert sufficient power to operate an indicating, recording and/or controlling apparatus without considerable auxiliary equipment.

It is an object of this invention to provide electrical motor means for converting a variable A. C. potential into a high torque mechanical motion.

It is a further object of this invention to provide such a device in which the mechanical motion is linearly responsive to the A. C. potential.

These and other objects and advantages of this invention, which will be in part obvious and in part pointed out hereinafter, are obtained by the means described in the following specification, and may be more readily understood by reference to the accompanying drawings, showing one of the various possible embodiments of this invention, in which:

Figure 1 is a diagrammatic showing, partly in

Figure 2:
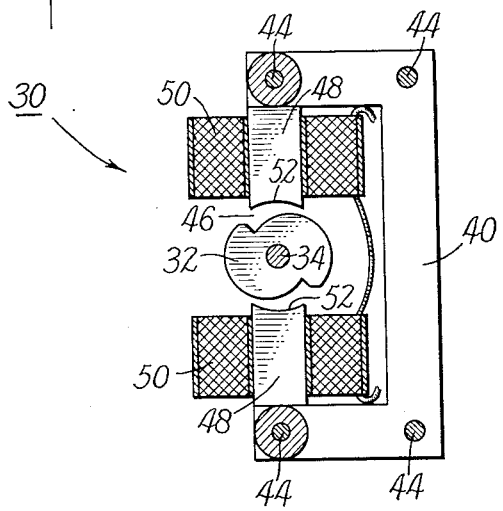
Figure 3:
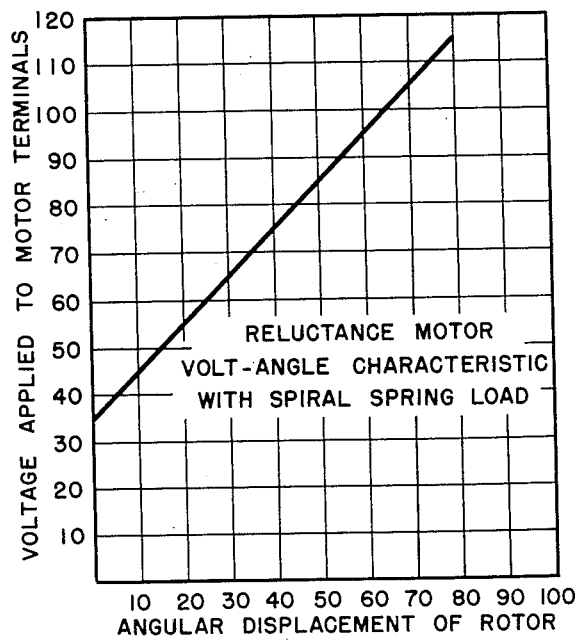

2 perspective, of a magnitude transmitting system including an A. C. reluctance motor embodying the invention herein described;

Figure 2 is a vertical cross-section of the motor of Figure 1 taken approximately along the line A—A; and Figure 3 is a graph illustrating the linear response characteristic of the motor of Figures 1 and 2 in accordance with the present invention.

The application of a translating device in accordance with the present invention is best illustrated by its application to a telescribing system of the type described in the above-mentioned copending application. In such a system, a translating device in accordance with this invention is the receiving element of a magnitude transmitting or telemetering system in which a small and delicate condition-sensitive-means, i. e., the stylus linkage of the telescriber transmitter, is able to control the position of an indicator of large mass, i. e., the pen linkage of the telescriber receiver, remotely located with respect to the condition-sensitive-means. In such a communications system the translating element in the receiver must act instantaneously and linearly in order to reproduce an accurate facsimile of the graphic characters traced by the stylus in the transmitter and to do this it must overcome the large inertia of the considerable mass of the pen-moving mechanism and the friction of this mechanism and of the pen moving over the recording surface. Such a result can be obtained by the use of a translating device of the type of the present invention.

Referring to Figure 1, a stylus 2 in a telescriber transmitter, generally indicated at 4, moves a linkage mechanism 6, one part of which causes a shaft 8 to rotate to move the rotary contact 10 of a potentiometer 12 which is connected across a source of alternating current potential 14 through conductors 16 and 18. Thus there is produced between the conductor 18 and the rotary contact 10 an A. C. potential, the average value of which is at all times a direct measure of one of the co-ordinates of the graphic character being traced by stylus 2 in telescriber 4. This potential is transmitted through transmission lines 20 and 22, respectively, to a point, which may be remote with respect to the transmitting mechanism 4 just described, where the A. C. potential is supplied to the two terminals 24 and 26 of a high torque A. C. reluctance motor, generally indicated at 30, made in accordance with the present invention, to position the rotor 32 thereof in accordance with the instantaneous average value of the A. C. potential impressed on the motor 30. The rotor 32 rotates a shaft 34 against the force of a coiled spring 37, to move one side of a pen-driving mechanism 35 of a telescriber receiver device, generally indicated at 36. Thus, the shaft 34 continuously maintains a position directly and linearly proportional to one co-ordinate of the graphic character being traced by the transmitter stylus 2.

In a similar manner, the other co-ordinate of the graphic character being traced by transmitter stylus 2 is converted into an A. C. potential by a potentiometer device 13, similar to potentiometer 12, from which an A. C. potential corresponding in average value to the other co-ordinate of the character being transmitted is carried by transmission lines 20 and 21 to another A. C. reluctance motor device 31, similar to motor 30, which rotates a shaft 33 to move the other side of the pen-driving mechanism 35 of the telescriber mechanism 36 by an amount directly and linearly proportional to the other co-ordinate of the graphic character being telescribed. Thus the pen 38 reproduces accurately and instantaneously the graphic character being traced by transmitting stylus 2.

In accordance with the present invention, the high torque A. C. reluctance motor 30 is provided with a specially shaped rotor 32 contoured to produce a linear relationship between the magnitude of the applied A. C. voltage and the angular position of the rotor 32 when working against a load whose torque varies inversely with the angular position of the rotor, i. e., spring 37. As can best be seen in the cross-sectional view of the motor 30 shown in Figure 2, this motor has a rectangularly shaped magnetic field structure 40, preferably made of laminated silicon steel and held together by clamping frame plates 42 clamped together by through bolts 44. One side of the magnetic field structure 40 is provided with an air gap 46 thus forming pole pieces 48 on either side thereof. Field coils 50, wound around these pole pieces 48, are connected in series across the terminals 24 and 26 connected to lines 20 and 22 from the transmitter 4, as above described in connection with Figure 1. The pole faces 52 of the pole pieces 48 are cylindrically concave to receive the rotor 32. The rotor 32 is preferably made of a stack of laminations of suitable magnetic material such as silicon steel, clamped together and secured to the motor shaft 34. Shaft 34 is suitably journaled in bearing plates 54, secured to the bolts 44 passing through the clamping plates 42 of the field structure 40, parallel to the pole pieces 48 as above described. The rotor 32 is given a predetermined shape, for example that shown in Figure 2, so as to provide the motor with a straight-line characteristic relationship as above mentioned. A spiral spring 37 is provided to bias the shaft 34 to a normal position such that the rotor 32 bears the relationship to the pole faces 52 shown in Figure 2 and to provide a torque opposing the rotational torque of the rotor 32. One end of the spiral spring 37 is secured to a collar 58 attached to the shaft 34 by means of a set screw 60, the other end is clamped to a right angle bracket 62 which is adjustably secured to the front bearing plate 54 by means of a nut 64 threaded onto a bearing sleeve 66 secured to the bearing plate 54 as may be more readily seen in Figure 1. Bracket 62 is suitably angularly positioned with respect to bearing plate 54 so as to position the rotor 32 in its normal angular position with respect to the pole faces 52 as shown in Figure 2. A collar 68 is attached to shaft 34 by means of a set screw 70 so that the shaft 34, and therefore the rotor 32, may be suitably positioned longitudinally with respect to the field structure 40. In order to provide means for adjusting the length and therefore the torque of spring 37, a clamping arrangement is provided on the bracket 62 for clamping the spring 37 to accurately determine its effective length. This clamping arrangement comprises a bolt 72 passing through the bracket 62 and having a hole 74 in one end thereof through which the end of the spring 37 passes. A nut 76 is threaded onto bolt 72 and the other side of the bracket 62 whereby any portion of the end of the spring 56 can be clamped against the bracket 62. In operation, when the field coils 50 are energized, the rotor 32 of the reluctance motor 30 thus formed, due to its configuration, tends to rotate in the direction shown by the arrow in Figure 2 in an effort to reduce the air gap between the pole faces 52 and the periphery of the rotor 32, and thus reduce the reluctance of the magnetic circuit 40. This rotation, however, is opposed by spring 37, and therefore the angular rotation of the rotor 32 is a function of the value of the voltage across the coils 50 and increases as this voltage increases.

In the embodiment shown, the special form of the rotor 32 causes this increase to be linear with respect to voltage. This can be shown by the following analysis. The torque produced in a rotary electro-magnet may be expressed in the following formula:

$$T = -\frac{1}{8\pi}\phi^2 \frac{dR}{d\alpha} \quad (1)$$

where,

T = torque $\phi$ = flux in the gap $\frac{dR}{d\alpha}$ = rate of change of reluctance, with respect to angle of rotation.

Let $-\frac{1}{8\pi} = K_3$ then $$T = K_3 \phi^2 \frac{dR}{d\alpha} \quad (2)$$

The flux is proportional to the alternating potential applied, as shown in the formula:

$$\phi = \frac{V}{K_1} \quad (3)$$

where

V = potential $K_1 = 4.44\, fN\, T_0^{-8}$ in which, f = frequency in cycles per second N = number of turns in the coil.

A linearly varied voltage, to be impressed, may be expressed as:

$$V = K\alpha + c \quad (4)$$

where, c = initial voltage

K = a constant, being the change in voltage, with the desired change in angle.

It is desired that the torque vary as a constant function of the angle of rotation. This may be expressed as:

$$T = T_0 + K_2 \alpha \qquad (5)$$

where, $T_0$ = initial torque
$K_2$ = a constant, being the desired change in torque with change in angle. This expression defines the constants of the spring 37.

Substituting the values in Equations 3, 4 and 5, in Equation 2:

$$\frac{dR}{d\alpha} = \frac{K_1^2}{K_3} \cdot \frac{T_0 + K_2 \alpha}{(K\alpha + c)^2} \qquad (6)$$

and integrating:

$$R = \frac{K_1^2}{K_3 K} \left[ \frac{K_2}{K} \left( \log_n \{K\alpha + c\} + \frac{c}{K\alpha + c} \right) - \frac{T_0}{\alpha + c} \right] + C_1 \qquad (7)$$

in which, $C_1$ a constant of integration, equals the initial value of reluctance, when $\alpha = 0$.

In the present embodiment of the invention, the length of gap is varied as a function of a generating angle, about the center of the rotor 32, which angle equals zero, when the angle of rotation equals zero. This may be expressed as:

$$l = f(\phi) \qquad (8)$$

where, $l$ = air gap length
$\phi$ = generating angle.

Now, the infinitesimal permeance of the gap may be expressed as:

$$dP = \frac{\left(r - \frac{l}{2}\right) d\phi}{l} \qquad (9)$$

where, $r$ = radius of stator gap.

Integrating, the total permeance is:

$$P = \int_\alpha^{\alpha+b} \frac{\left(r - \frac{l}{2}\right) d\phi}{l} \qquad (10)$$

where, $b$ = included angle under the pole face 52.

Since the reluctance is inverse to the permeance, the reluctance is expressed $$R = \frac{1}{\int_\alpha^{\alpha+b} \frac{\left(r - \frac{l}{2}\right) d\phi}{l}} \qquad (11)$$

By equating Formula 11 to Formula 7, the length of gap, for each angle about the rotor may be determined. This, of course, determines the radius of the rotor for each angle.

Illustrative of the application of the above, in a particular motor developed the constants were as follows:

Equation 4:

$$V = K\alpha + c$$

$K = 1.0$
$c = 34.5$ volts.

Equation 5:

$$T = T_0 + K_2 \alpha$$

$T_0 = 1.6$ ounce inches
$K_2 = .144$ ounce inches per degree.

Equation 11:

$$R = \frac{1}{\int_\alpha^{\alpha+b} \frac{\left(r - \frac{l}{2}\right) d\phi}{l}}$$

$b = 60°$
$r = .505$ inch.

The length of gap required was found to be such that, $$\log_n l = 5.004 - 2.054 \times 10^{-2} \phi - 1.968 \times 10^{-22} \phi^{10}$$

where, $l$ = length of gap in thousandths of inches.

From this analysis it can be seen that a high-torque A. C. reluctance motor in accordance with the present invention is provided with pole faces surrounding a substantial portion of the periphery of the rotor and having a length of the same order of magnitude as the diameter of the rotor, and in which the entire area of the pole faces are effectively operative at all positions of rotation of the rotor.

Figure 3 shows the response curve of an actual high torque A. C. reluctance motor constructed in accordance with the invention herein described showing the linear response of such a motor to the A. C. potential impressed thereon.

Although the electro-mechanical translating device of the present invention has been described in connection with a telescriber system, it is obvious that its usefulness is not confined to such use, but rather that it is applicable to use in any system in which an A. C. potential is to be accurately and linearly translated into a mechanical motion of high torque, linearly proportional to the value of the actuating A. C. potential. It is to be understood that this invention is capable of many modifications without departing from its spirit or scope. It is not to be limited to the precise embodiment shown and described but only as indicated in the claims.

We claim:

1. A high-torque A. C. reluctance motor for providing a controlled rotation of less than 180°, comprising, in combination, a C-shaped stator of magnetic material having a gap therein of circular cross-section between the ends thereof, a winding encircling said stator for energizing the motor, and a cylindrical rotor of magnetic material rotatably mounted in said stator gap on an axis coinciding with the longitudinal axis of said gap, the pole faces of said stator surrounding at least one third of the surface of said rotor, and said rotor having a cross-sectional radius which continuously and smoothly increases from each of two diametrically opposite points on its periphery to the other said point to gradually and continuously decrease the air gap and therefore the reluctance of the magnetic path between said rotor and said pole face in a continuous and smooth curve as said rotor rotates to move said given point from under said pole face.

2. A high-torque A. C. reluctance rotator for providing a controlled rotation of less than 180°, comprising, in combination, a C-shaped stator member of magnetic material having a gap therein of circular cross-section between the ends thereof, a winding encircling said stator member for energizing the motor, a cylindrical rotor member of magnetic material rotatably mounted in said stator gap on an axis coinciding with the longitudinal axis of said gap, said rotor member having a cross-sectional radius which continuously and smoothly increases from each of two diametrically opposite points on its periphery to the other said point to gradually and continuously decrease the air gap and therefore the reluctance of the magnetic path between said rotor member and said pole face in a continuous smooth curve as said rotor member rotates to move said given point from under said pole face and wherein the length of the air gap is determined by the relationship $$R = \frac{1}{\int_{\alpha}^{\alpha+b} \frac{\left(r - \frac{l}{2}\right) d\theta}{l}}$$

in which:
R = desired reluctance at any predetermined angle of rotation,
l = length of the air gap,
r = radius of the stator gap,
α = angle of rotation,
b = included angle under the pole face,
θ = generating angle.

3. A high-torque A. C. reluctance rotator for providing a controlled rotation of less than 180° comprising, in combination, a field structure made of a stack of laminations of magnetic material forming a magnetic circuit closed except for an air gap having a circular cross-section, a field winding encircling said magnetic circuit for energizing the motor, an armature formed of a stack of laminations of magnetic material rotatably supported on a shaft in said air gap, said armature having a cross-section the radius of which continuously and smoothly increases through about 180° from two diametrically opposite points on its periphery whereby the gap between said armature and said field structure gradually and continuously decreases as said armature rotates from a predetermined angular position, and a long spiral spring encircling said shaft and biasing said armature toward said predetermined angular position to provide a torque opposing rotation of said armature.

4. In a high torque A. C. reluctance motor of the type wherein an element is moved at a receiving station with true fidelity of response to the movement of an element at a sending station and wherein the receiving station is connected to the sending station by circuit channels carrying alternating current from the sending station to the receiving station, the combination of, a C-shaped stator magnetic core having a gap between a pair of oppositely disposed pole faces, said pole faces extending along a circular cylindrical surface and forming a large portion of the surface thereof, a winding through which the current from the sending station flows encircling said stator member to set up magnetic flux through said stator member thereby to energize the motor, a rotor of magnetic material having its axis substantially coincidental with the axis of said cylindrical surface and having a cylindrical peripherial surface which is uniform in cross-section in the direction of the axis of the rotor and which varies in radius around the circumference of the rotor, the radius being a minimum at first and second diametrically opposite points on the circumference and being a maximum at first and second diametrically opposite points on the circumference with the radius of the rotor increasing from said first and second points of minimum radius respectively to said first and second points of maximum radius and with the first point of maximum radius being adjacent the second point of minimum radius and the second point of maximum radius being adjacent the first point of minimum radius, means mounting said rotor in said gap with each point of minimum radius of the rotor being adjacent one edge of the respective pole face of the stator member whereby the energization of the motor tends to cause rotation of the rotor, and spring-biasing means operatively connected to said rotor tending to hold said rotor in said predetermined position and tending to oppose said rotation of said rotor.

5. A high torque A. C. reluctance motor for use in a telescriber system wherein an A. C. potential, produced at a transmitting station and varied in accordance with a coordinate of a graphic character to be telescribed, is transmitted to a receiving station through a suitable transmission medium, where the graphic character is faithfully and instantaneously reproduced with the reluctance motor moving a pen member through a pen linkage structure, said reluctance motor comprising, in combination, a C-shaped stator member of magnetic material having a gap therein between a pair of oppositely disposed pole faces, said gap having a circular cross-section and an axial length of the same order of magnitude as the diameter of said gap cross-section, a winding adapted to be connected to an A. C. circuit from a transmitting station and encircling said stator member to set up therein a magnetic flux varying in accordance with the variations in a coordinate of a graphic character being telescribed, a cylindrical rotor member of magnetic material rotatably mounted in the gap in said stator member on an axis coinciding with the longitudinal axis of said stator gap and having a maximum diameter only slightly less than that of said gap, said rotor member having a non-circular cross-section in which the radius increases through about 180° from two diametrically opposite points on its periphery, and a long spiral spring encircling the shaft of said rotor and secured thereto and to a structure attached to said stator member to provide a rotational bias in accordance with Hooke's law to tend to maintain said rotor in a position in which the minimum radii of said rotor member are under one edge of each of said pole faces to tend to oppose rotation of said rotor in a direction which gradually and continuously decreases the air gap between said stator and said rotor as the energization of said winding is increased, whereby a linear relationship is produced between the value of the A. C. potential impressed on said winding and the angular position of said rotor member.

6. A high torque A. C. reluctance motor for use in a telescriber system wherein an A. C. potential, produced at a transmitting station and varied in accordance with a coordinate of a graphic character to be telescribed, is transmitted to a receiving station through a suitable transmission medium, where the graphic character is faithfully and instantaneously reproduced with the reluctance motor moving a pen member through a pen linkage structure, said reluctance motor comprising, in combination, a C-shaped stator member of magnetic material having a gap therein between a pair of oppositely disposed pole faces, said gap having a circular cross-section and an axial length of the same order of magnitude as the diameter of said gap cross-section, a winding adapted to be connected to an A. C. circuit from a transmitting station and encircling said stator member to set up therein a magnetic flux varying in accordance with the variations in a coordinate of a graphic character being telescribed, a cylindrical rotor member of magnetic material rotatably mounted in the gap of said stator member on an axis coinciding with the longitudinal axis of said stator gap and having a maximum diameter only slightly less than that of said gap, said rotor member having a non-circular cross-section and comprising two portions which are semi-circular in cross-section with their flat sides in the same plane and with their axes parallel and off-set so that the radius of said rotor increases through substantially 180° from two diametrically opposite points on its periphery, and rotational-bias resilient means connected to said rotor member to bias said rotor member against the torque created on said rotor means by energization of said winding, whereby a linear relationship is produced between the value of the A. C. potential impressed on said winding and the angular position of said rotor member.

WALLACE A. LAUDER.
EDWARD F. CAHOON.

REFERENCES CITED

The following references are of record in the file of this patent:

UNITED STATES PATENTS

| Number | Name | Date |
|---|---|---|
| 1,544,871 | Tiffanny | July 7, 1925 |
| 1,915,069 | Morrill et al. | June 20, 1933 |
| 2,121,699 | Janzen | June 21, 1938 |
| 2,364,656 | Price | Dec. 12, 1944 |

FOREIGN PATENTS

| Number | Country | Date |
|---|---|---|
| 397,569 | Great Britain | Aug. 31, 1933 |
| 400,654 | Great Britain | Oct. 30, 1933 |